United States Patent [19]

Cunningham

[11] Patent Number: 4,734,823

[45] Date of Patent: Mar. 29, 1988

[54] FAULT CURRENT INTERRUPTER AND EXPLOSIVE DISCONNECTOR FOR SURGE ARRESTER

[75] Inventor: Francis V. Cunningham, Western Springs, Ill.

[73] Assignee: Joslyn Corporation, Chicago, Ill.

[21] Appl. No.: 794,085

[22] Filed: Nov. 1, 1985

[51] Int. Cl.[4] .................................... H02H 3/22

[52] U.S. Cl. .................................... 361/125; 361/117; 361/131

[58] Field of Search .................................... 361/117–120, 361/125, 128, 130, 131, 134, 135, 136

[56] References Cited

U.S. PATENT DOCUMENTS

| | | | |
|---|---|---|---|
| 2,315,320 | 3/1943 | Earle | 361/125 |
| 2,607,869 | 8/1952 | Stoelting et al. | 361/125 X |
| 2,860,210 | 11/1958 | Stoelting et al. | 361/125 X |
| 3,017,539 | 1/1962 | Robinson | 361/125 |
| 3,100,246 | 8/1963 | Riley | 361/131 X |
| 3,803,524 | 4/1974 | Schmalz et al. | 361/136 X |
| 4,204,238 | 5/1980 | Stetson | 361/125 |
| 4,471,402 | 9/1984 | Cunningham | 361/135 X |
| 4,503,414 | 3/1985 | Sykes et al. | 361/131 X |

*Primary Examiner*—A. D. Pellinen
*Assistant Examiner*—A. Jonathan Wysocki
*Attorney, Agent, or Firm*—Mason, Kolehmainen, Rathburn & Wyss

[57] ABSTRACT

A fault current interrupting disconnector, or fault disconnector, for a surge arrester operates to separate an electrical lead or ground lead wire from a damaged arrester and to interrupt the current flowing through the damaged arrester. The new fault disconnector includes an explosive charge, a tube of ablative material in a surrounding housing which co-acts with the tube to form a venting chamber, and a conductor extending through a portion of the chamber and through the tube. Excessive current heats and explodes the charge. The explosion pulls the conductor from an elongate connection, through the chamber portion and on through the tube; whereby arcing is first delayed, then is initiated in the chamber and then is drawn into and extinguished within the tube.

23 Claims, 7 Drawing Figures

FAULT CURRENT INTERRUPTER AND EXPLOSIVE DISCONNECTOR FOR SURGE ARRESTER

BACKGROUND OF THE INVENTION

1. Field of the Invention

This invention relates to disconnectors for surge arresters and to surge arresters that include disconnectors, and more particularly, to a new and improved disconnector capable of interrupting electric system fault current that may arc within a damaged surge arrester.

2. Description of the Prior Art

In service, when a surge arrester is subjected to excess electrical energy, a fault current arc may form within the housing of the surge arrester, thereby developing extreme heat and pressure that may explode the metallic end caps or covers off of the housing and violently expel the internal arrester components. In addition, the housing may shatter. This may damage nearby apparatus, set fires, and injure personnel or by-standers.

A partial solution to this problem is provided by a follow current interrupting disconnector as described in U.S. Pat. No. 3,869,650. This prior art disconnector is most effective in those cases where a gap structure within a surge arrester has been rendered ineffective to interrupt follow current, and where the follow current has not yet developed into a fault current arc.

Follow current is system alternating current that flows through the undamaged valve blocks of an arrester following a surge discharge operation. When follow current is not interrupted by the arrester, arrester valve blocks become damaged and allow the follow current to increase rapidly and to become an arcing fault current flow within an arrester. Frequently, fault current develops before a follow current interrupting disconnector can operate; and an arrester explosion may result. Whereas follow current magnitude is limited by valve block resistance, fault current magnitude is limited mainly by the electric system impedance after the valve blocks have been damaged. Generally, in surge arresters, follow currents may be limited to tens or hundreds of amperes conducted through the valve blocks, while fault currents are often thousands of amperes that arc through or around valve blocks.

U.S. Pat. No. 2,504,438 also describes (at column 3, lines 35-53) a surge arrester disconnector having an indicated ability to interrupt the flow of follow current. However, prior art disconnectors have not demonstrated the ability to reliably interrupt damaging fault current. Thus there is need for a fault current disconnector capable of both disconnecting a circuit wire from an arrester and of effectively interrupting fault current to prevent damage, injuries, and fires.

SUMMARY OF THE INVENTION

An object of the invention is to provide a new and improved surge arrester that has the ability to interrupt fault current flowing within its housing.

Another object of the invention is to provide a new disconnector for disconnecting a surge arrester from an electrical circuit while at the same time interrupting the fault current arc within the surge arrester.

Briefly, the device of the present invention may be provided as a separate new fault current interrupting disconnector for attachment in electrical series with a surge arrester, or it may be included as a component part or parts of a new and improved surge arrester. The new and improved surge arrester comprises a main insulating housing and arrester elements within the housing. The elements include valve blocks formed of either silicon carbide or metal oxide, and may include gap structures. Also included in the main housing, or in a second housing attached to the main housing, as in the case of the new fault disconnector, is an insulating tube formed of an arc quenching material. A conductive metallic member or conductor within the tube conducts all electrical currents that may also flow through the arrester elements or arc within the main housing. If the arrester fails and follow current flows continuously, or if fault current flows and arcs through the arrester, an explosive charge in the path of the current explodes to withdraw the conductive member from the tube, forming and stretching an arc within the tube. This action extinguishes the arc, thereby preventing the explosion of a damaged arrester. At the same time, a circuit wire connected to the arrester at one end of the tube is disconnected from the arrester, thereby preventing the re-establishment of current flow and permitting visual identification of a damaged arrester, as indicated by the disconnected circuit wire.

The ability of this new fault disconnector to withstand and to interrupt fault current has been enhanced by the inclusion of means for controlling the pressures developed by arcing within the tube. The controlling means involves the delaying of the formation of the arc within the disconnector to shorten total arcing time, the delaying of the movement of the arc into the tube by first lengthening the arc within a relatively vented space at one end of the tube, and finally by the moving of the arc into the tube while venting the gas pressures into the vent space as well as into the tube and eventually out of a remote, externally vented end of the axial aperture or bore in the tube. Another important pressure controlling means included in this new fault disconnector is the extension of the enclosed vent or space disposed at an end of the aperture or bore of the arc quenching tube to form a chamber extending to surround a portion of the length of the arc quenching tube. The arc is initiated within the vent and then elongated into the tube by movement of the conductive member through the tube. Initial pressure is controlled by venting or expansion of gases from the vent and into the chamber, while ultimate pressure is controlled by the tube dimensions and the additional venting through the remote end of the tube to the atmosphere. Extension of the chamber to surround the arc quenching tube allows a thin walled tube to withstand higher pressures within its bore, since venting into the chamber increases the pressure surrounding the tube.

BRIEF DESCRIPTION OF THE DRAWING

The above and other objects and advantages and novel features of the present invention will become apparent from the following detailed description of several embodiments of the invention illustrated in the accompanying drawing wherein.

DESCRIPTION OF THE PREFERRED EMBODIMENTS

Figure 1:
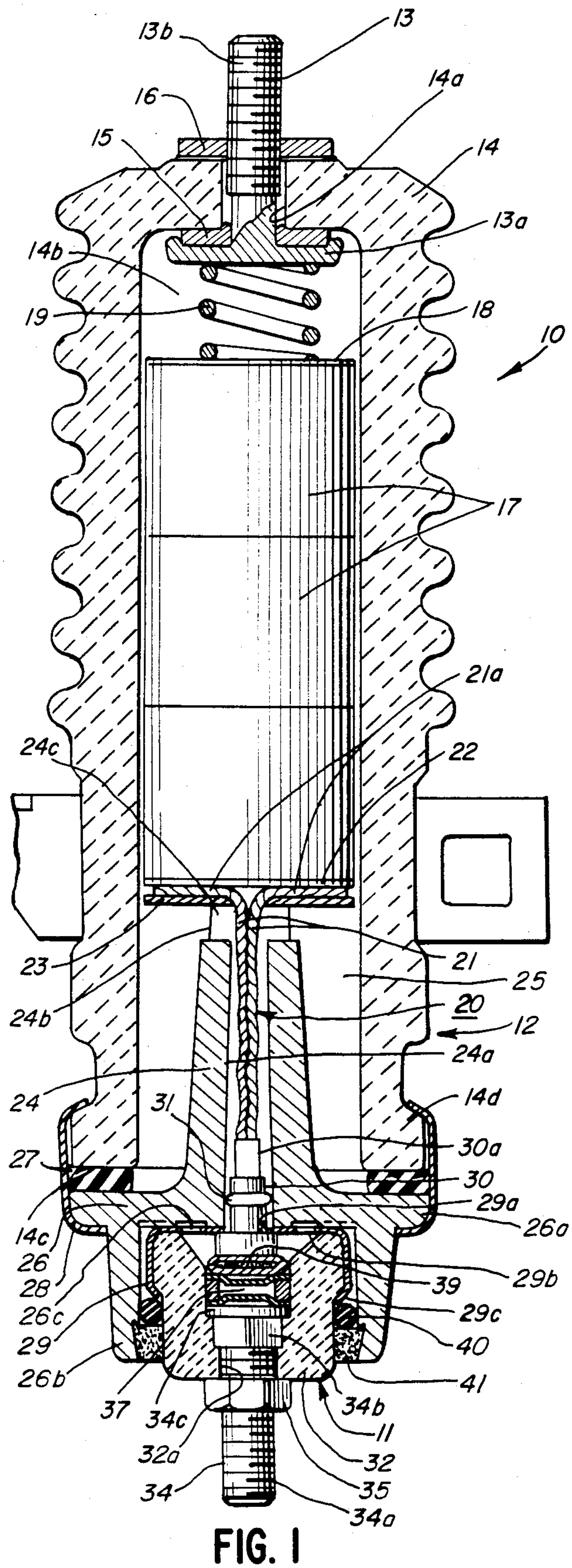
FIG. 1 is a sectional view of a surge arrester that includes a fault disconnector means constructed in accordance with the principles of the present invention.

Referring to the drawing and initially to FIG. 1, there is illustrated a new and improved surge arrester 10 including a disconnecting and fault current interrupting means indicated generally by the reference numeral 12. The fault disconnector 12 includes an explosive disconnection means indicated generally by the reference numeral 11. The surge arrester 10 comprises an upper terminal 13 which has a flat, enlarged head portion 13*a* disposed within the upper end of an insulating housing 14 formed of ceramic material such as porcelain. The shank portion 13*b* of the terminal 13 extends through an opening 14*a* in the upper end of the housing 14; and a gasket 15 is interposed between the under surface of the housing end and the head portion 13*a*. A lock nut 16 is threaded onto the threaded end of the shank 13*b* of the terminal and is seated against the outer surface of the housing end to hold the terminal 13 in position. The terminal 13 is electrically connected via a line (not shown) to one end of a voltage source and interconnected to one terminal of an electrical equipment, such as a transformer, to be protected by the surge arrester 10.

The surge arrester 10 also includes a plurality of valve blocks 17 stacked end to end within an enlarged inner chamber 14*b* formed in the housing 14. The valve blocks 17 are made of silicon carbide or metal oxides which undergo a rapid decrease in electrical resistance when subjected to increased current flow. An upper contact plate 18 is seated against the outer surface of the uppermost valve block by a coil spring 19 interposed between the terminal head 13*a* and the contact plate 18. The spring 19 ensures good contact between the plate 18 and the uppermost valve block 17 and maintains firm end to end engagement between the valve blocks 17 in the stack and provides good electrical connection between the terminal 13 and the contact plate 18. A gap (not illustrated) consisting of one or more electrical spark gaps may also be disposed between the terminal 13 and the contact plate 18, particularly when the valve blocks 17 are made of silicon carbide.

The valve blocks 17 are electrically connected to the disconnection means 11 by a connection means indicated generally by the reference numeral 20 and including electrical conductors 21. The connection means extends from the under side of the lowermost valve block to the upper end of the disconnector 11. Electrical connection of the upper ends of the conductors 21 to the lower valve block is effected by sandwiching the outwardly bent ends 21*a* of the conductors 21 between a lower valve block contact plate 22 and an annular contact support plate 23. The contact plate 22 is located at the bottom of and is in firm engagement with the lowermost valve block in the stack. The plate 23 extends parallel to the plate 22, is of generally disc-like configuration and has a central opening for accommodating the conductors 21 which extend downwardly through a central bore or aperture 24*a* in a tube 24 forming part of the fault current interrupter 12. The upper end 24*b* of the tube 24 forms a seat or support for the plate 23. The end 24*b* is also provided with a slot 24*c* to provide passage for flow of gases between the bore 24*a* and a venting chamber 25 surrounding the exterior of the tube 24. The coil spring 19 exerts sufficient pressure through the valve blocks 17 to hold the conductor ends 21*a* firmly between the contact plate 22 and the plate 23 and also to seat the latter plate snugly against the upper end of the support 24*b*.

The tube 24 preferably is formed integrally with a body portion 26 and extends vertically upward into the lower end of the chamber 14*b* but is spaced from the lower end of the housing 14 and extends axially thereof to define the generally annular venting chamber 25 around the tube 24. The tube 24 and body portion 26 are formed of ablative material such as acetal resin which rapidly evolves gases when subjected to heat generated by an electrical arc. The gases aid in the eventual extinguishing of the arc in the event of fault current flow through the surge arrester 10. The body portion 26 is provided with an outer annular flange 26*a* forming a shoulder to provide a seat for a sealing ring or gasket 27 which is compressed between the flange 26*a* and the lower end 14*c* of the housing 14. The body portion 26 also includes an integral downwardly extending, cylindrically shaped wall 26*b* forming a chamber for receiving the disconnection means 11. A clamp 28 preferably formed of deformable metal is crimped over the flange 26*a* and over a flange 14*d* on the lower end of the housing 14 to hold the body portion 26 on the latter housing and to exert sufficient force to compress the ring 27 in order to form a seal.

Figure 4:
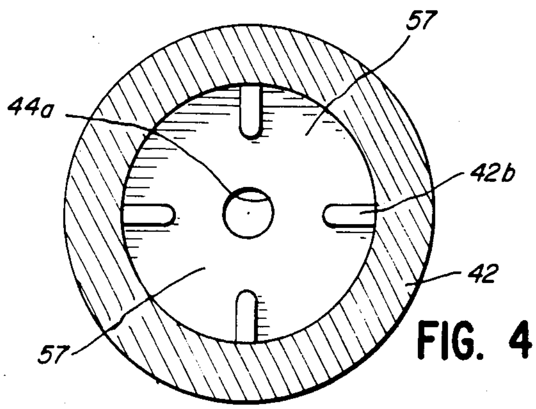
FIG. 4 is a sectional view taken along line 4—4 of FIG. 2.
Figure 5:
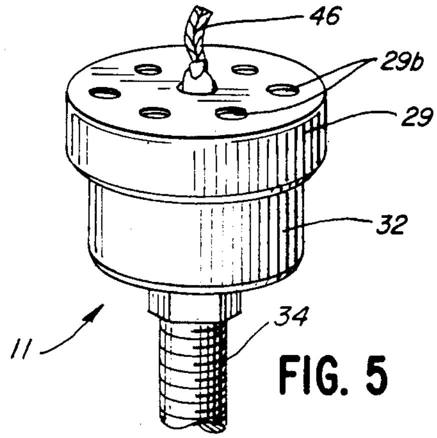
FIG. 5 is a perspective view showing the explosive disconnection means employed in the embodiments of the invention illustrated in FIGS. 2 and 3.
Figure 6:
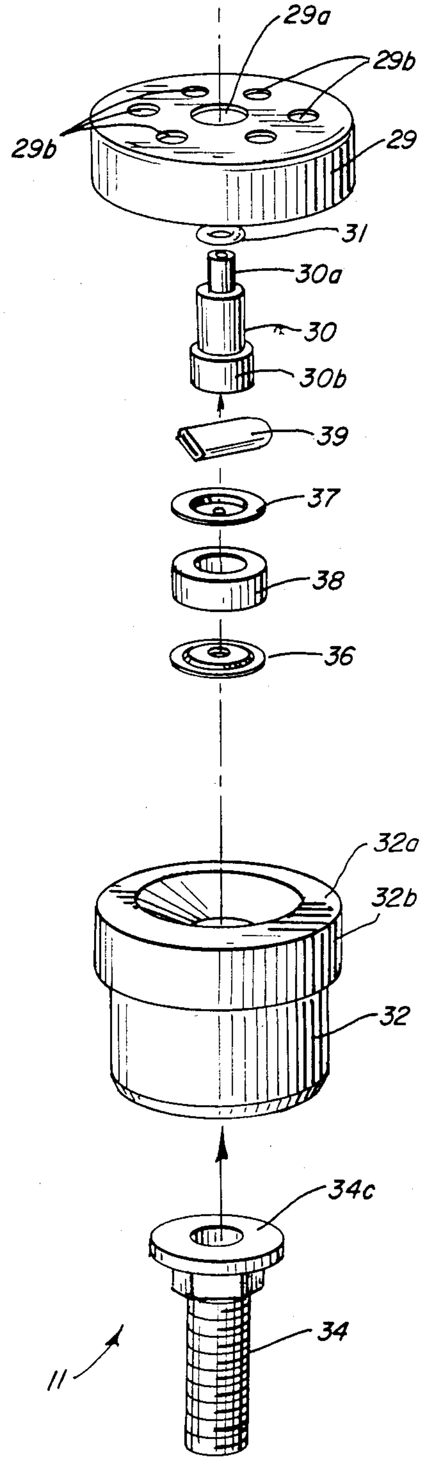
FIG. 6 is an exploded, perspective view showing the parts comprising the explosive disconnector illustrated in FIG. 1.

The disconnection means 11, which is like that shown in greater detail in FIGS. 4 and 5, is best shown in FIG. 6 and includes a generally cup-shaped cap 29 formed of metal and having a central opening 29*a* in the flat, upper portion thereof and a plurality of spaced vent openings 29*b* also formed in the flat upper portion but spaced outwardly from the central opening 29*a*. As is best shown in FIG. 1, each of the openings 29*b* opens to a gas passage 26*c* extending between the cap 29, the lower inside surface of the body portion 26, and the cylindrical wall 26*b*. An upper terminal 30 of the disconnector 11 has its shank extending through the central opening 29*a*. An O-ring sealing gasket 31 engages the inner surface of the tube 24 that forms the bore or aperture 24*a*. The terminal 30 is formed of an electrically conductive material such as copper. The upper end of the terminal 30 is reduced and hollowed as indicated at 30*a* to form a ferrule for accommodating the lower ends of the conductors 21 which may be crimped or otherwise attached within the hollow, reduced end 30*a* to provide an electrical connection to the terminal 30 and, hence, to the disconnector 11. An enlarged head portion 30*b* (FIG. 6) on the terminal 30 provides a shoulder that seats against the under surface of the flat top of the cap 29.

The disconnection means 11 further includes an insulating housing 32 which may be formed of a phenolic material and used for physically supporting the other components of the disconnection means 11. The lower end 29c (FIG. 1) of the cap is compressed over the lower end of a raised portion 32b on the periphery of the upper end of the housing 32.

A ground lead terminal 34 has a threaded shank 34a extending through a central opening 32a (FIG. 1) in the lower end of the housing 32 to receive a ground lead conductor (not shown) that provides a current return to the voltage source and is also electrically interconnected to one end of the device to be protected. A nut 35 threaded onto the shank 34a and a collar 34b integral with the shank, coact to hold the terminal 34 on the housing 32. The collar 34b includes an enlarged head 34c located at the bottom of an explosion chamber formed within and centrally of the housing 32. A portion of the collar 34b is polygonally shaped to fit within a complementary shaped recess formed in the housing 32 at the bottom of the explosion chamber to prevent rotation of the ground terminal 34 after it is assembled on the housing 32. An upwardly extending, electrically conductive lower gap electrode 36 of dish-like shape (i.e. inverted) has its edge resting against the upper surface of the head 34c and, hence, is electrically connected to the ground terminal 34.

The explosive disconnection means 11 further includes a second, electrically conductive, gap electrode 37 of dish-like shape spaced above the electrode 36 to form an arc gap between the two center portions of the dish-shaped electrodes 36 and 37. Each of the two electrodes 36 and 37 is preferably formed of brass and each includes a first circumferentially located, generally flat edge portion and a second generally flat, centrally located, upraised or pedestal portion that functions as a surface for a terminal of an electrical arc. The spacing between the two gap electrodes 36 and 37 is defined and maintained by a resistor 38 of generally annular shape disposed between the respective edge portions of the electrodes. The two gap electrodes and the spacing resistor 38 are located within the explosion chamber of the housing 32. The resistor 38 is preferably formed of elastomeric material, such as carbon impregnated rubber, and, in addition to its electrode spacing function, it serves in normal operation to maintain at a low level the voltage across the gap between the electrodes 36 and 37. Normal charging and leakage currents are discharged by the resistor 38 while an overvoltage surge causes an electric arc to develop between the electrodes 36 and 37.

The explosion chamber within the housing 32 also contains an explosive cartridge 39 including an outer cartridge casing preferably formed of brass. The cartridge casing is generally similar to that described and illustrated in U.S. Pat. No. 4,471,402 and there identified by the reference numeral 50 and is shaped to fit within the upper end of the explosion chamber and to seat against the outer edge portion of the upper gap electrode 37. The casing forms an inner chamber which is filled with a cartridge charge.

As is best shown in FIG. 1, the lower end chamber of the body 26 is hermetically sealed by an O-ring seal or gasket 40 disposed between the periphery of the housing 32 and the inner surface of the wall 26b and also by a locking compound 41, such as epoxy resin, in the space below the gasket 40 and between the wall 26b and the housing 32.

Upon the occurrence of an overvoltage surge between the terminals 13 and 34, an electrical arc is developed between the electrodes 36 and 37 and both surge current and follow current, if any, will pass through the valve blocks 17, through the conductors 21 and through the explosive disconnection means 11. The current path through the disconnection means 11 includes the upper terminal 30, the casing of the cartridge 39, the electric arc across the gap electrodes 36 and 37 and the ground terminal 34. Heat generated by the arc is conducted to the cartridge casing where it acts in the manner described in the aforementioned U.S. Pat. No. 4,471,402 to heat the explosive charge. If the follow current persists for a sufficient time, the follow current will increase and become fault current which, in the absence of the fault current interrupting means 12, could set off an explosion of the arrester parts that could cause damage, injuries or fires.

The fault current interrupting means 12 of the present invention prevents such an explosion of the arrester 10. Thus, when fault current flows through the arrester 10, the explosive charge within the cartridge 39 explodes, forcing gases at high pressure through the vents 29a and into the gas passage 26c, thereby expelling the disconnection means 11 from the chamber formed by the wall 26b and withdrawing the conductors 21 through the bore 24a. When the ends 21a of the conductors disengage the plates 22 and 23, an electrical arc is formed between the conductor ends and these plates. As the conductor ends are drawn through the tube 24 the arc is drawn along and the heat of the arc causes the ablative material to evolve gases. The quenching effect of the gases and the lengthening of the arc result in its rapid extinguishment, thereby preventing explosion of a damaged arrester. When the explosive charge is set off by the fault current, the conductors 21 are disconnected from the lower end of the valve blocks and expelled from the lower end of the housing 26, thereby preventing re-establishment of current flow through the valve blocks. The dangling end of the ground lead and the exposed conductors 21 provide a visible indication that the arrester has failed.

Because the upper ends 21a of the conductors 21 are elongated they move in contact with the plates 22 and 23 for a period of time after the explosive charge is set off. Therefore, the initiation of the electrical arc between the conductor ends and these plates is delayed until the extreme ends of the conductors are fully withdrawn from the area between the plates 22 and 23, thus shortening the total arcing time remaining before the next 60 Hz current zero, when arc interruption can occur. In addition, the arc is first formed in a vented space, before it is drawn into the somewhat smaller volume within the tube 24, further shortening the total time of arcing within the tube, which allows the interrupter 12 to interrupt higher magnitude fault currents without being damaged itself. This higher current interrupting capability is also enhanced by venting the gas pressures from the tube into the relatively large chamber 25, as well as into the lower end of the bore 24a and eventually through the lower, vented end of that bore. The advantages just described are best achieved if the contact ends 21a of the conductors are at least about ½ inch in length. The total time of arcing within the tube can thus be limited to less than one quarter cycle of fault current flow before interruption of the higher fault current occurs.

Figure 2:
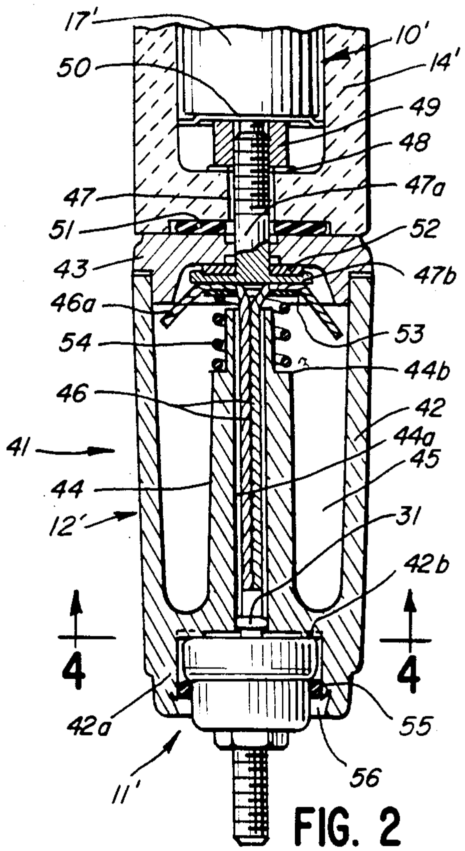
FIG. 2 is a broken away, sectional view of a fault disconnector comprising another embodiment of the present invention wherein the fault disconnector is detachably secured to one end of the housing for the surge arrester.

In a second embodiment of the invention illustrated in FIG. 2, the fault current interrupter and explosive disconnection means are contained within a two piece housing 41 that is separate from the arrester housing, as contrasted with the embodiment illustrated in FIG. 1 wherein the arrester housing forms at least part of the fault interrupting means 12. More specifically, in the embodiment illustrated in FIG. 2, a fault current interrupting means 12' including an explosive disconnection means 11' is attached to the lower end of a surge arrester 10' which includes a housing 14' formed of insulating material and containing a stack of valve blocks 17' only one of which is visible in the broken away section depicted in FIG. 2.

The housing 41 includes a lower, generally cup-shaped member 42 and an upper cover 43, sonically sealed together. Formed integral with the member 42 and extending vertically upward within and axially of the housing 41 is a tube 44 which performs the same function as the tube 24 previously described. The tube 44 is spaced from the inner wall of the member 42 to form a relatively large annular vent chamber 45 surrounding the tube 44 for venting gases generated in the event fault current flows through the arrester 10' to cause the disconnection means 11' to operate and develop an electrical arc between the lower terminal of the arrester 10' and the conductors 46 forming part of the fault interrupting means 12'. The cup-shaped member 42, its integral tube 44 and the cover 43 are all formed of ablative material such as acetal resin. As is best shown in FIGS. 2 and 4, equally spaced ribs 42b formed integrally with the body member 42 engage the upper surface of the housing for the disconnection means 11' to form passages for the flow of gases into an annular space between the disconnector housing and a generally cylindrical, downwardly extending wall 42a formed integral with the body member 42.

A central opening in the cover 43 accommodates the shank 47a of a terminal 47 extending from the chamber 45 into the lower end of the arrester housing 14'. The upper end of the shank 47a passes through a washer 48 and is threaded into a nut 49 which seats against a lower terminal plate 50 of the valve block stack 17'.

A sealing gasket 51 is disposed between the lower end of the housing 14' and the top surface of the cover 43. An enlarged, generally flat head 47b at the lower end of the terminal 47 is spaced from the bottom surface of the cover 43 by a sealing gasket 52. Upper, bent ends 46a of the conductors 46 are clamped between the head 47b and a flat, centrally apertured, annular plate 53 which is urged towards the head 47b by a coil spring 54 interposed between the plate 53 and a shoulder 44b formed by the reduced upper end of the tube 44.

The ends 46a of the conductors 46 may extend into the chamber 45 beyond the space between the plate 53 and the terminal head 47b. This arrangement increases the time during which the conductors 46 remain electrically connected to the lower terminal 47 of the surge arrester when the disconnection means 11' is operated and, hence, delays the development of an electrical arc between the ends of the conductors 46 and the terminal 47 and/or the plate 53 to achieve the beneficial results described above with respect to shortening of the total arcing time. The electrical arc is initially formed in the venting chamber 45 which has sufficient volume to accommodate the gases generated by the arc.

The explosive disconnection means 11' is inserted into a downwardly facing, open-ended chamber at the bottom of the housing defined by the wall 42a. A sealing ring 55 and a sealing compound 56 are packed into the space between the wall 42a and the housing for the disconnector to effect an hermetic seal. Open spaces 57 (FIG. 4) formed in the member 42 between the ribs 42b permit passage of gases generated within the disconnection means 11'. The disconnector means 11' is identical to the disconnector means 11 previously described and includes a terminal 30 electrically connected to the lower ends of the conductors 46 so that, upon operation of the disconnector in the manner previously described, the ends 46a of the conductors are withdrawn from engagement with the head 47b and the plate 53 to draw an electrical arc between one or both of the latter elements and the conductor ends 46a. That arc is first developed at the upper end of the chamber 45, is then elongated and drawn into the bore 44a in the tube 44 and is thereafter extinguished by the combined action of the disconnection means 11' in lengthening the arc as the conductor ends 46a are drawn through the bore and of the gases evolved from the material of which the tube 44 and the housing member 42 are made. The ends 46a of the conductors 46 are maintained in electrical contact with the head 47b and the plate 53 during at least the first one-half inch of movement of the conductors 46 in order to achieve the desired delay in initiation of the arc and the shortening of the total arcing time. Thus, the embodiment of the invention illustrated in FIG. 2 operates in the manner heretofore described to achieve the aforementioned objects and advantages of the invention.

Figure 3:
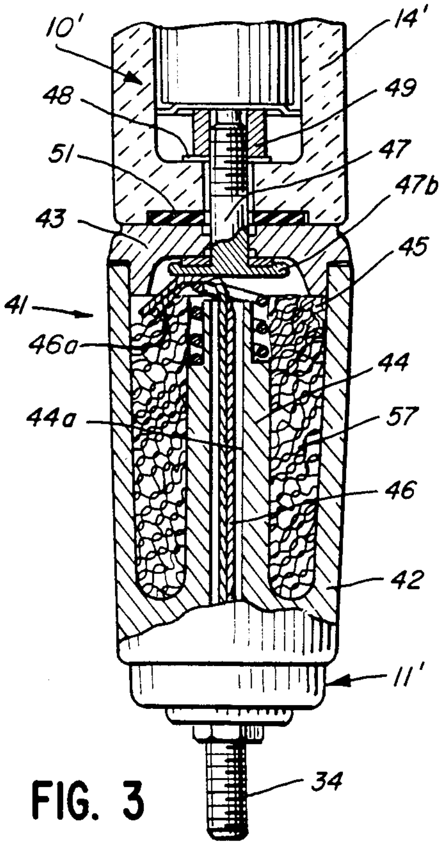
FIG. 3 is a view similar to FIG. 2 but shows a metallic mesh disposed within a venting chamber of a fault current disconnector.

The embodiment of the invention illustrated in FIG. 3 is similar to that illustrated in FIG. 2 except that the former includes a flexible, wire mesh 57, preferably formed of intermeshed copper wire or strands, in the venting chamber 45 for the purpose of cooling and condensing the gases produced when the disconnection means 11' is operated, thereby reducing the internal gas pressure in the chamber during arc interruption. Also the washer 53 (FIG. 2) is eliminated.

Figure 7:
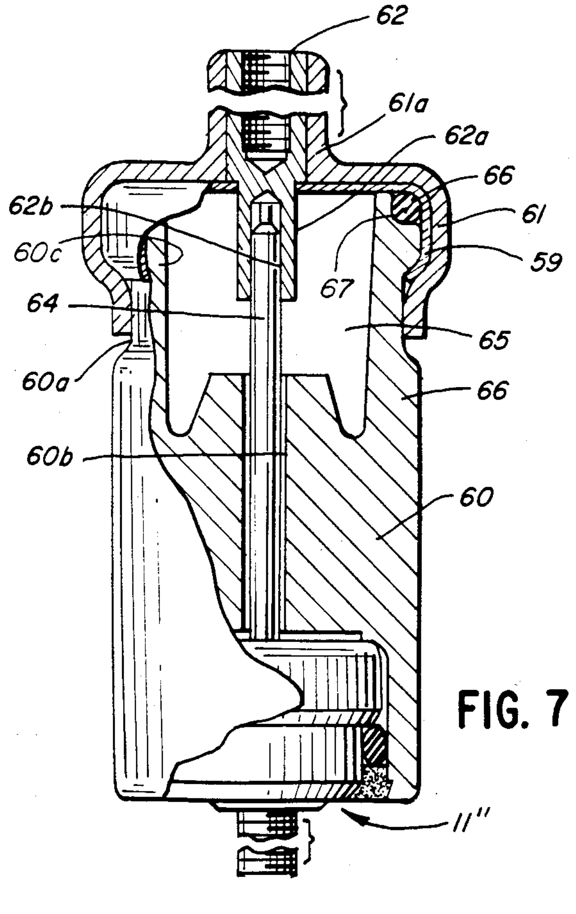
FIG. 7 is a partly broken away, sectional view illustrating another embodiment of a fault current disconnector for attachment to one end of the housing for a surge arrester constructed in accordance with the principles the present invention.

The embodiment of the invention illustrated in FIG. 7 comprises a separate unit for use in series with a surge arrester and such unit includes an explosive disconnection means 11'' that is virtually identical to the disconnection means employed in the device depicted in FIG. 2 and illustrated in detail in FIG. 6. In the embodiment shown in FIG. 7 a housing or body member 60 is formed of ablative or gas evolving material such as acetal resin and is formed with an annular peripheral groove 60a. Crimped into the groove 60a is the lower end of a metallic, electrically conductive, generally cup-shaped, inverted cover 59 for the upper end of the body member 60. The internally threaded, female end of a connector 62 may be threaded onto an external electrical terminal (not shown) at one end of a surge arrester. Insulating cover 61, which may be formed of heat shrinkable tubing, protects against external flashover due to hot ionized gases surrounding the housing 60 after a fault current interruption. A reduced shank end 62a on the connector 62 extends through a central opening in the top of the cover 59 and electrically connects to the upper free end of an elongated rod-like conductor 64 which extends into the open end of a vertical, blind-ended, downwardly facing recess 62b formed in the shank end 62a. The end of the conductor 64 preferably extends into the recess 62b for at least one-half inch in order to maintain electrical connection between the conductor 64 and the connector 62 for a brief period after the disconnection means 11'' operates, thereby delaying development of an electrical arc between those elements and decreasing the total arcing time.

The shank end 62*a* of the connector 62 protrudes into a venting chamber 65 of relatively large volume defined by the cover 59 and by a vertically and upwardly extending, generally cylindrical wall 60*c* formed integrally with the body member 60. The upper end of the chamber 65 is sealed by a gasket or O-ring 66 seated within a peripheral, annular groove 67 at the upper end of the wall 60*c* and engaging the inner surface of the cover 59. The rod-like conductor 64 extends axially of the chamber 65 and through an elongated, vertical, central bore or aperture 60*b* in the body member 60. The conductor 64 is electrically and mechanically connected to the upper end of the explosive disconnection means 11″, which, except for the connection to a rod-like conductor instead of the twisted wire conductors employed in the embodiments previously described, is similar to the disconnectors 11 and 11′ referred to above. The venting chamber 65 is of sufficient volume to receive the gases generated when the explosive disconnector 11″ is operated to draw an electrical arc between the connector 62 and the upper end of the conductor 64. This arc is initially formed in the relatively large chamber 65 and is then stretched into the bore 60*b* by the movement of the conductor rod 64. The bore 60*b* is open at its upper end to the venting chamber 65 to permit the flow of gases into the venting chamber 65. The chamber 65 is thus able to accommodate the gases generated prior to extinguishment of the arc, which extinguishment is accomplished by lengthening the arc as the conductor 64 is drawn downwardly through the bore 60*b* and by gases evolved from the body member 60.

Obviously, many modifications and variations of the present invention are possible in light of the above teachings. Thus, it is to be understood that, within the scope of the appended claims, the invention may be practiced otherwise than as specifically described above.

What is claimed and desired to be secured by Letters Patent is:

1. A fault current disconnector for a surge arrester comprising an insulating member formed of arc quenching material and having bore means for quenching an arc, a conductive member extending within said bore means, a sealed venting chamber at least partially surrounding said insulating member, said chamber being in communication with one end of said bore means for venting of hot gases from said bore means, and means for moving said conductive member to form an arc, said moving means comprising an explosive charge disposed at a second end of said bore means.

2. A fault current disconnector as recited in claim 1 wherein said chamber is enclosed by an insulating housing surrounding and spaced from said insulating member.

3. A fault current disconnector as recited in claim 2 further comprising means for supporting said conductive member within said housing.

4. A fault current disconnector as recited in claim 3 wherein said housing, said member, and at least part of said supporting means are formed intergrally as a single, unitary component part of said disconnector.

5. A fault current disconnector as recited in claim 1 further comprising material disposed within said chamber for condensing said hot gases.

6. A fault current disconnector for a surge arrestor comprising an insulating member formed of arc quenching material and having an aperture for quenching an electric arc, conductive means extending within said aperture, explosive means for moving said conductive means to initiate and then to stretch an electric arc into said aperture, and means for controlling the pressure developed by arcing within said aperture, said controlling means comprising a sealed chamber for receiving gases from said aperture that have been heated and expanded within said aperture by an electric arc.

7. A fault current disconnector as recited in claim 6 wherein said insulating member extends at least partially into said chamber.

8. A fault current disconnector as recited in claim 6 wherein said chamber is disposed at one end of said aperture and said explosive means is disposed beyond a second end of said aperture.

9. A fault current disconnector as recited in claim 6 wherein said insulating member is formed of acetal resin.

10. A fault current disconnector as recited in claim 6 further comprising an insulating housing, said insulating member and said chamber being disposed at least partially within said housing.

11. A fault current disconnector as recited in claim 6 wherein said explosive means is disposed within a vented container.

12. A fault current disconnector as recited in claim 6 wherein said conductive means is a flexible stranded metallic cable.

13. A fault current disconnector as recited in claim 6 further comprising an electrical circuit wire connected to said disconnector, said explosive means further comprising means for disconnecting said wire from at least a portion of said disconnector.

14. A fault current disconnector as recited in claim 10 further comprising means for supporting said insulating member within said housing, said supporting means and said housing being made of the same insulating material and formed as a single, unitary component part.

15. A fault current disconnector for a surge arrester comprising a housing formed of dielectric material and having an inner surface, an elongated member-formed of dielectric material having an outer surface and a bore, said elongated member being at least partially disposed and supported within said housing, means for cooling gases resulting from an electric arc, said cooling means comprising a sealed chamber formed between said inner surface and said outer surface and vented to one end of said bore, an elongated metallic component extending within said bore, means for connecting a circuit wire at one end of said housing, and explosive means for moving said metallic component from said bore and for separating said circuit wire from at least a portion of said disconnector upon the occurrence of fault current flow, said explosive means being disposed at a second end of said bore.

16. A combined surge arrester and fault current interrupter comprising an arrester housing formed of insulting material, a valve element disposed within said housing, an insulating member formed of arc quenching material and having a bore, a conductive member extending within said bore and being disposed in electrical series connection with said valve element, means for receiving gases from said bore, said receiving means comprising a sealed chamber vented to said bore, and means for moving said conductive member from said series connection to form an electrical arc, said moving means comprising an explosive charge.

17. A surge arrester and interrupter as recited in claim 16 wherein said chamber is disposed at least partially within said housing.

18. A surge arrester and interrupter as recited in claim 16 further comprising a second housing formed of insulating material and disposed at an end of said arrester housing, said chamber being disposed at least partially within said second housing.

19. A surge arrester and interrupter as recited in claim 16 wherein said insulating member is disposed at least partially within said chamber.

20. A fault current interrupter for a surge arrester comprising a unitary housing formed of a dielectric material, said housing including a bore, first and second chambers, and first, second, third and fourth closure portions, said first chamber being disposed within said first portion, said second chamber being disposed within said second portion, said third portion being disposed within said first chamber and enclosing said bore, said bore extending between and opening into said first and second chambers, said fourth portion being disposed to support said third portion and to separate said first and second chambers, a metallic component disposed within said bore, and means including an explosive charge for moving said metallic component from said bore, said moving means being disposed within said second chamber.

21. A fault current interrupter for a surge arrester comprising means for quenching an electrical arc, said quenching means comprising arc quenching material formed to define an aperture, a conductor having a first portion extending within said aperture, means for moving said conductor to form and to draw an arc into said aperture, and means for delaying the entry of an arc into said aperture, said delaying means comprising a second portion of said conductor extending beyond said aperture to be moved into said aperture by said moving means before an arc is drawn into said aperture.

22. A fault current interrupter for a surge arrester comprising arc quenching material formed to define an aperture, an explosive charge for initiating an arc and means for controlling the pressure developed by an arc within said aperture, said controlling means comprising a sealed chamber for receiving hot gases from said aperture.

23. A fault current disconnector for a surge arrester comprising an insulating member formed of arc quenching material, said insulating member including bore means for quenching an arc, a conductive member extending within said bore means, means for forming an arc within said disconnector, and a sealed venting chamber at least partially surrounding said insulating member, said chamber being in communication with one end of said bore means for venting hot gases from said bore means.

* * * * *

UNITED STATES PATENT AND TRADEMARK OFFICE

CERTIFICATE OF CORRECTION

PATENT NO. : 4,734,823

DATED : March 29, 1988

INVENTOR(S) : Francis V. Cunningham

It is certified that error appears in the above-identified patent and that said Letters Patent is hereby corrected as shown below:

Column 10, lines 60-61, delete "insulting" and insert therefor --insulating--

Signed and Sealed this

Twenty-third Day of August, 1988

*Attest:*

DONALD J. QUIGG

*Attesting Officer* — *Commissioner of Patents and Trademarks*